US011272450B2

(12) United States Patent
Dalsgaard et al.

(10) Patent No.: US 11,272,450 B2
(45) Date of Patent: Mar. 8, 2022

(54) MBSFN MEASUREMENTS AND DRX, DIFFERENT DRX SETTINGS FOR DIFFERENT TRANSMISSION TYPES

(71) Applicant: Nokia Technologies Oy, Espoo (FI)

(72) Inventors: Lars Dalsgaard, Oulu (FI); Ilkka Keskitalo, Oulu (FI); Jorma Johannes Kaikkonen, Oulu (FI); Jussi-Pekka Koskinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 56 days.

(21) Appl. No.: 15/129,135

(22) PCT Filed: Apr. 3, 2014

(86) PCT No.: PCT/US2014/032840
§ 371 (c)(1),
(2) Date: Sep. 26, 2016

(87) PCT Pub. No.: WO2015/152927
PCT Pub. Date: Oct. 8, 2015

(65) Prior Publication Data
US 2017/0111955 A1    Apr. 20, 2017

(51) Int. Cl.
*H04W 52/02* (2009.01)
*H04W 76/28* (2018.01)
(Continued)

(52) U.S. Cl.
CPC ....... *H04W 52/0225* (2013.01); *H04W 24/02* (2013.01); *H04W 76/28* (2018.02); *H04W 76/40* (2018.02); *Y02D 30/70* (2020.08)

(58) Field of Classification Search
CPC ... H04W 76/048; H04W 76/40; H04W 76/28; H04W 52/0225; H04W 76/002
See application file for complete search history.

(56) References Cited

U.S. PATENT DOCUMENTS

| | | | |
|---|---|---|---|
| 2008/0101268 A1 | 5/2008 | Sammour et al. | |
| 2012/0039229 A1* | 2/2012 | Etemad | H04W 4/06 370/312 |

(Continued)

FOREIGN PATENT DOCUMENTS

| | | |
|---|---|---|
| DE | 10305358 | 7/2004 |
| EP | 1530395 | 5/2005 |

(Continued)

OTHER PUBLICATIONS

International Search Report and Written Opinion received for corresponding Patent Cooperation Treaty Application No. PCT/US2014/032840, dated Feb. 5, 2015, 14 pages.

(Continued)

*Primary Examiner* — Yaotang Wang
(74) *Attorney, Agent, or Firm* — Mintz Levin Cohn Ferris Glovsky and Popeo, P.C.

(57) ABSTRACT

Methods and apparatus, including computer program products, are provided for MBSFN measurements. In one aspect there is provided a method. The method may include receiving, by a user equipment, an indication of a monitoring requirement (202, 204) for at least one of an idle mode of operation at the user equipment or a connected mode of operation at the user equipment; receiving, by the user equipment, information (206) for one or more transmissions (MBMS) that are multicast or broadcast; and measuring, by the user equipment, the one or more transmissions (MBMS) that are multicast or broadcast, the measuring performed in accordance with the received information (206) and without regard to the indication of the monitoring requirement (202, 204) for at least one of the idle mode of operation or the connected mode of operation. Related apparatus, systems, methods, and articles are also described.

20 Claims, 5 Drawing Sheets

(51) Int. Cl.
*H04W 76/40* (2018.01)
*H04W 24/02* (2009.01)

(56) References Cited

U.S. PATENT DOCUMENTS

| | | | | |
|---|---|---|---|---|
| 2013/0010624 | A1* | 1/2013 | He | H04L 41/5032 370/252 |
| 2013/0107790 | A1* | 5/2013 | Lee | H04W 4/06 370/312 |
| 2015/0282132 | A1* | 10/2015 | Kim | H04W 8/005 370/329 |
| 2015/0373507 | A1* | 12/2015 | Jung | H04W 24/02 370/235 |
| 2016/0119762 | A1* | 4/2016 | Zhu | H04W 72/042 370/312 |

FOREIGN PATENT DOCUMENTS

| | | |
|---|---|---|
| GB | 2406751 | 4/2005 |
| WO | 2005067180 | 7/2005 |

OTHER PUBLICATIONS

3GPP, "Technical Specification Group Radio Access Network; Evolved Universal Terrestrial Radio Acces (E-UTRA); Multiplexing and channel coding (Release 12)," 3rd Generation Partnership Project, 3GPP TS 36.212 V12.0.0, Dec. 2013, (88 pages).
3GPP, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3rd Generation Partnership Project, 3GPP TS 36.300 V12.1.0, Mar. 2014, (209 pages).
3GPP, "Technical Specification Group Radio Access Network; Evolved Universal Terrestrial Radio Access (E-UTRA); LTE physical layer; General description (Release 11)," 3rd Generation Partnership Project, 3GPP TS 36.201 V11.1.0, Dec. 2012, (13 pages).
3GPP, "Technical Specification Group Radio Access Network; Evolved Universal Terrestrial Radio Access (E-UTRA); Medium Access Control (MAC) protocol specification (Release 12)," 3rd Generation Partnership Project, 3GPP TS 36.321 V12.1.0, Mar. 2014, (57 pages).
3GPP, "Technical Specification Group Radio Access Network; Evolved Universal Terrestrial Radio Access (E-UTRA); Physical channels and modulation (Release 12)," 3rd Generation Partnership Project, 3GPP TS 36.211 V12.1.0, Mar. 2014, (120 pages).
3GPP, "Technical Specification Group Radio Access Network; Evolved Universal Terrestrial Radio Access (E-UTRA); Physical layer procedures (Release 12)," 3rd Generation Partnership Project, 3GPP TS 36.213 V12.1.0, Mar. 2014, (186 pages).
3GPP, "Technical Specification Group Radio Access Network; Evolved Universal Terrestrial Radio Access (E-UTRA); Physical layer; Measurements (Release 11)," 3rd Generation Partnership Project, 3GPP TS 36.214 V11.1.0, Dec. 2012, (14 pages).
3GPP, "Technical Specification Group Radio Access Network; Evolved Universal Terrestrial Radio Access (E-UTRA); Radio Resource Control (RRC); Protocol specification (Release 11)," 3rd Generation Partnership Project, 3GPP TS 36.331 V11.7.0, Mar. 2014, (350 pages).
3GPP, "Technical Specification Group Radio Access Network; Evolved Universal Terrestrial Radio Access (E-UTRA); User Equipment (UE) procedures in idle mode (Release 12)," 3rd Generation Partnership Project, 3GPP TS 36.304 V12.0.0, Mar. 2014, (34 pages).

* cited by examiner

MBSFN MEASUREMENTS AND DRX, DIFFERENT DRX SETTINGS FOR DIFFERENT TRANSMISSION TYPES

RELATED APPLICATION

This application was originally filed as PCT Application No. PCT/US2014/032840 filed Apr. 3, 2014.

FIELD

The subject matter described herein relates to wireless communications and, in particular, mobility.

BACKGROUND

Discontinuous Reception (DRX) generally refers to a user equipment configured to enter into a DRX state during which time the user equipment enters into a power savings state. This power savings state may include reduced measurement requirements, polling, user equipment monitoring requirements, and/or the like. When data transfer is needed, the user equipment may exit the standby DRX state, and enter a non-DRX or higher power consumption state and begin more active measurements, polling, monitoring, and data transfer with the network. For example, in Long Term Evolution (LTE), the user equipment is typically required to read the physical downlink control channel (PDCCH) for allocations. When the user equipment is configured with a DRX cycle, the user equipment may be on and thus available to read the PDCCH for a portion of the DRX cycle, and then may be off and not available to read the PDCCH for another portion of the DRX cycle. The longer that the duration of the DRX cycle is, the greater the power savings. However, too long a DRX cycle may negatively affect mobility as the user equipment may miss mobility opportunities.

SUMMARY

Methods and apparatus, including computer program products, are provided for multicast broadcast single-frequency network measurements.

In some example embodiments, there may be provided method. The method may include receiving, by a user equipment, an indication of a monitoring requirement for at least one of an idle mode of operation at the user equipment or a connected mode of operation at the user equipment; receiving, by the user equipment, information for one or more transmissions that are multicast or broadcast; and measuring, by the user equipment, the one or more transmissions that are multicast or broadcast, the measuring performed in accordance with the received information and without regard to the indication of the monitoring requirement for at least one of the idle mode of operation or the connected mode of operation.

In some variations, one or more of the features disclosed herein including the following features can optionally be included in any feasible combination. The user equipment, while in at least one of the idle mode or the connected mode, may measure a radio channel in accordance with the received indication, without regard to the information for the one or more transmissions that are multicast or broadcast. The received information may include control channel configuration information. The control channel configuration information may include multimedia broadcast multicast service control channel configuration information. The received control channel configuration information may be carried by one or more system information blocks, dedicated signaling, or a combination of both. The monitoring requirement may be specified in a standard separately from the information. The monitoring requirement may be independent of the information. The monitoring requirement may include at least one of a radio resource control configuration, a discontinuous receive configuration information, or a combination of both. The one or more transmissions may include a multicast broadcast single-frequency network. The multicast broadcast single-frequency network may carry a multimedia broadcast multicast service. The measuring the one or more transmissions may include monitoring the one or more transmission. The idle mode and the connected mode may include a discontinuous receive mode.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
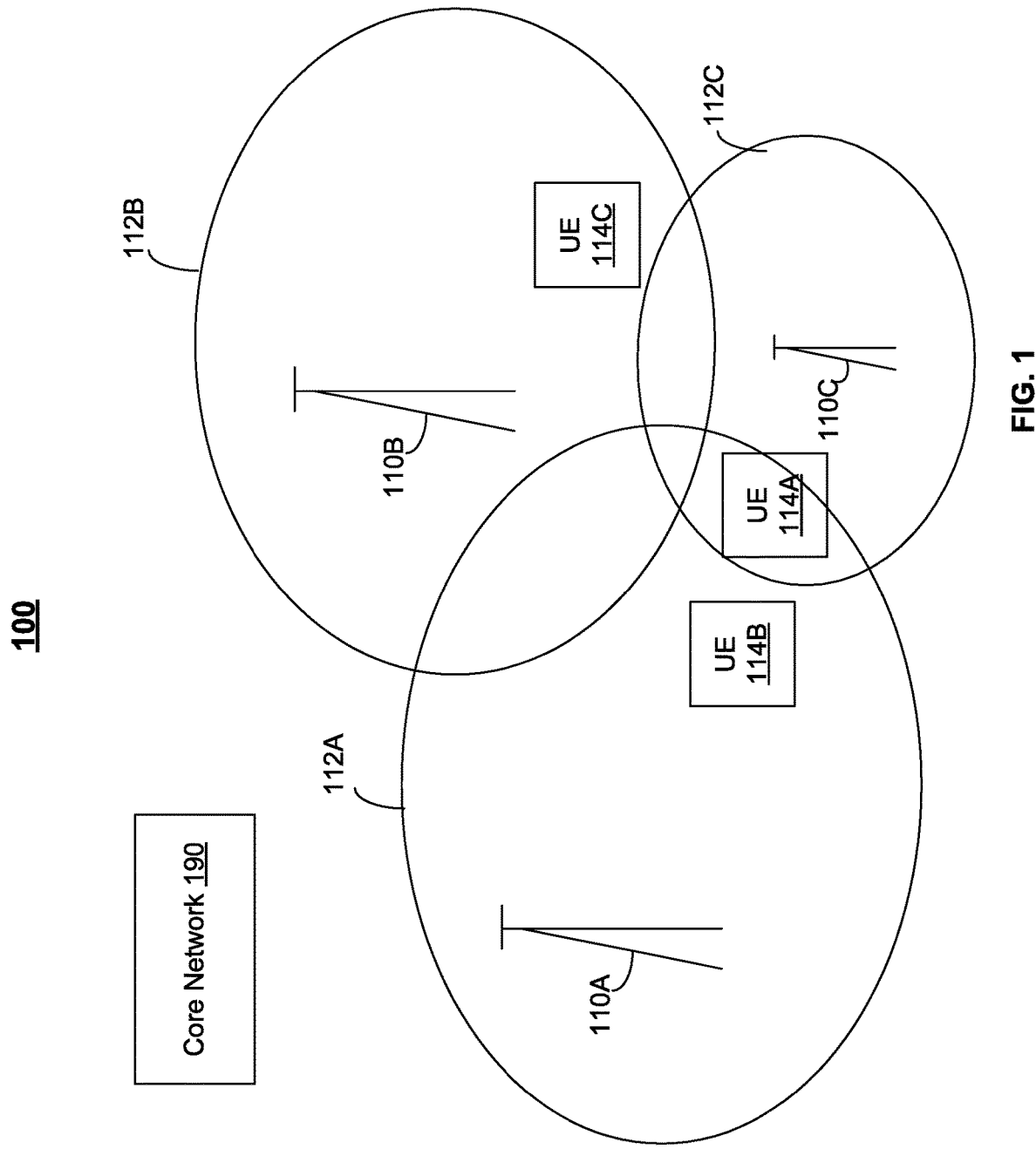
FIG. 1 depict an example of a system configured for multicast broadcast single-frequency network and discontinuous receive, in accordance with some exemplary embodiments.

Like labels are used to refer to same or similar items in the drawings.

DETAILED DESCRIPTION

Multimedia Broadcast Multicast Services (MBMS) relates to a multicasting services broadcast by one or more cellular base stations. For example, a cellular network may provide an application, such as mobile television as well as other applications, to one or more user equipment using for example a multicast broadcast single-frequency network (MBSFN) in which base stations transmit on the same frequency in a coordinated way to provide for example the mobile television broadcast as well as other applications. The one or more user equipment may be configured to perform measurements of the MBSFN, and report those measurements to the network. The measurement and reporting may be directed by the network and/or specified by a standard.

A user equipment may also be configured to provide power saving via the network (for example, based on the application(s) need for transmissions via DRX). For example, a user equipment in idle mode may apply DRX, when the user equipment is not otherwise required to be actively receiving (which may include receiving due to paging reception, cell detection, and/or measurement requirements). In the case of connected mode, a user equipment may apply DRX when the user equipment is not required to monitor for scheduling allocations for example, on a physical downlink control channel (PDCCH) and/or if no other requirements dictate that the user equipment is required to keep its receiver on for example for monitoring, measurements, and/or the like (for example, due to required PDCCH monitoring). In connected mode, the user equipment may keep its receiver active (for example, on) for a longer time than is required by the PDCCH monitoring rules in DRX (for example, due to cell detection, measurements, and/or fulfilling requirements related to detection/measurements).

Point-to-point PDCCH monitoring rules and requirements for connected mode may be performed in accordance with RRC Connected mode DRX rules, an example of which may be described in 3GPP TS 36.300, 36.331 and 36.321, while Idle mode paging reception may be governed by paging reception, an example of which is described in 3GPP TS 36.304.

However, these P2P monitoring and/or measurement rules/requirements for Connected and Idle mode DRX (and the corresponding paging reception) may not be applicable to a user equipment (or a plurality of user equipment) receiving a broadcast, such as in the case of MBMS reception. The MBSFN transmission, consisting of at least a MCCH (MBMS control channel) and a MTCH (MBMS traffic channel), may be indicated first by system information (for example, system information block 13 in the case of Long Term Evolution) where the MCCH configuration and mapping to physical layer radio resources are indicated. The MCCH may be configured for a single MBSFN area at the time, as well as a plurality of areas. The traffic channel (for example, MTCH) data allocation on radio resources may be indicated with the MBMS scheduling information (MSI) in the medium access control layer control information. Within the MBSFN area, there may be multiple services transmitted simultaneously (for example, not all of a plurality of user equipment that are receiving data at a certain MBSFN area are decode the same radio transport blocks). As such, there may be differences in the MBSFN reception between the plurality of user equipment even within a single MBSFN area. The MBSFN related measurements may be assumed to be done only on the occasions where the user equipment is decoding MBSFN data. Moreover, user equipment measurement requirements may be defined such that they are aligned with user equipment reception, so the user equipment is not required by the measurement requirements to activate its receiver only for the purpose of performing monitoring/measurements if the user equipment would otherwise not be required to activate its receiver for another reason.

Because of the differences in MBSFN and P2P transmission modes associated with DRX, it is very likely that one or more user equipment receiving the MBMS will not be using the same P2P-based DRX cycles. Specifically, a plurality of user equipment in MBMS are likely to not have the same Idle mode paging reception cycle and/or have the same connected mode DRX parameters configured.

In some example embodiments, the subject matter disclosed herein may provide MBSFN measurements and monitoring requirements that are independent from the P2P measurement and reporting requirements for connected mode DRX and an Idle mode DRX. That is, the MBSFN measurement performance requirements may have to be separate from non-MBSFN based measurement performance requirements (for example, which may be related to RSRP and RSRQ).

In some example embodiments, two independent measurement and monitoring processes may be specified at a user equipment. Specifically, a user equipment may include a first measurement and monitoring process for non-MBSFN related measurement(s) such as DRX related measurements and monitoring, and may include a second measurement and monitoring process for MBSFN related measurement(s), which may be performed independently from non-MBSFN related measurements.

Before providing additional examples related to independent MBSFN and DRX measurement and monitoring requirements, the following provides a description of an example of a system, in accordance with some example embodiments.

FIG. 1 depicts a system 100 including a core network 190 which may be coupled via one or more backhaul links/networks to a plurality of base stations, such as base stations 110A-C serving cells 112A-C, and corresponding user equipment 114A-C. Although FIG. 1 depicts a certain quantity and configuration of devices, other quantities and configurations may be implemented as well. For example, other quantities and configurations of base stations/access points, cells, and user equipment may be implemented as well.

In some example embodiments, user equipment, such as 114A-C, may be implemented as a mobile device and/or a stationary device. The user equipment may be referred to as, for example, a wireless device, a mobile station, a mobile unit, a subscriber station, a wireless terminal, a tablet, a smart phone, and/or the like. In some example embodiments, user equipment 114 may be implemented as multi-mode user devices configured to operate using a plurality of radio access technologies, although a single-mode device may be used as well. For example, user equipment 114 may be configured to operate using a plurality of radio access technologies including one or more of the following: Long Term Evolution (LTE), wireless local area network (WLAN) technology, such as 802.11 WiFi and the like, Bluetooth, Bluetooth low energy (BT-LE), near field communications (NFC), and any other radio access technologies. The user equipment may be located within the coverage area of a cell or multiple cells.

The base stations, such as base stations 110A-C may, in some example embodiments, be configured as an evolved Node B (eNB) type base station, although other types of base stations and wireless access points may be used as well. In the case of eNB type base station, the base station may be configured in accordance with standards, including the Long Term Evolution (LTE) standards, such as 3GPP TS 36.201, Evolved Universal Terrestrial Radio Access (E-UTRA); Long Term Evolution (LTE) physical layer; General description, 3GPP TS 36.211, Evolved Universal Terrestrial Radio Access (E-UTRA); Physical channels and modulation, 3GPP TS 36.212, Evolved Universal Terrestrial Radio Access (E-UTRA); Multiplexing and channel coding, 3GPP TS 36.213, Evolved Universal Terrestrial Radio Access (E-UTRA); Physical layer procedures, 3GPP TS 36.214, Evolved Universal Terrestrial Radio Access (E-UTRA); Physical layer-Measurements, and any subsequent additions or revisions to these and other 3GPP series of standards (collectively referred to as LTE standards). The base stations may also be configured to serve cells using a WLAN technology, such as WiFi (for example, the IEEE 802.11 series of standards), as well as any other radio access technology capable of serving a cell. In the example of FIG. 1, base station/access point 110C may be configured to serve small cell using WiFi, although any other radio access technology may be used as well. The base stations may have wired and/or wireless backhaul links to other networks and/or network nodes including core network 190. Although some of the examples described herein refer to E-UTRAN, other types of networks, such as UTRAN (UMTS Terrestrial Radio Access Network), GERAN (GSM EDGE Radio Access network), WCDMA (Wideband Code Division Multiple Access), HSPA (High Speed Packet Access), and/or any other type of radio network. Moreover, the base stations may be configured to support MBMS and, as such, a MBSFN to one or more user equipment 114A-C.

Figure 2A:
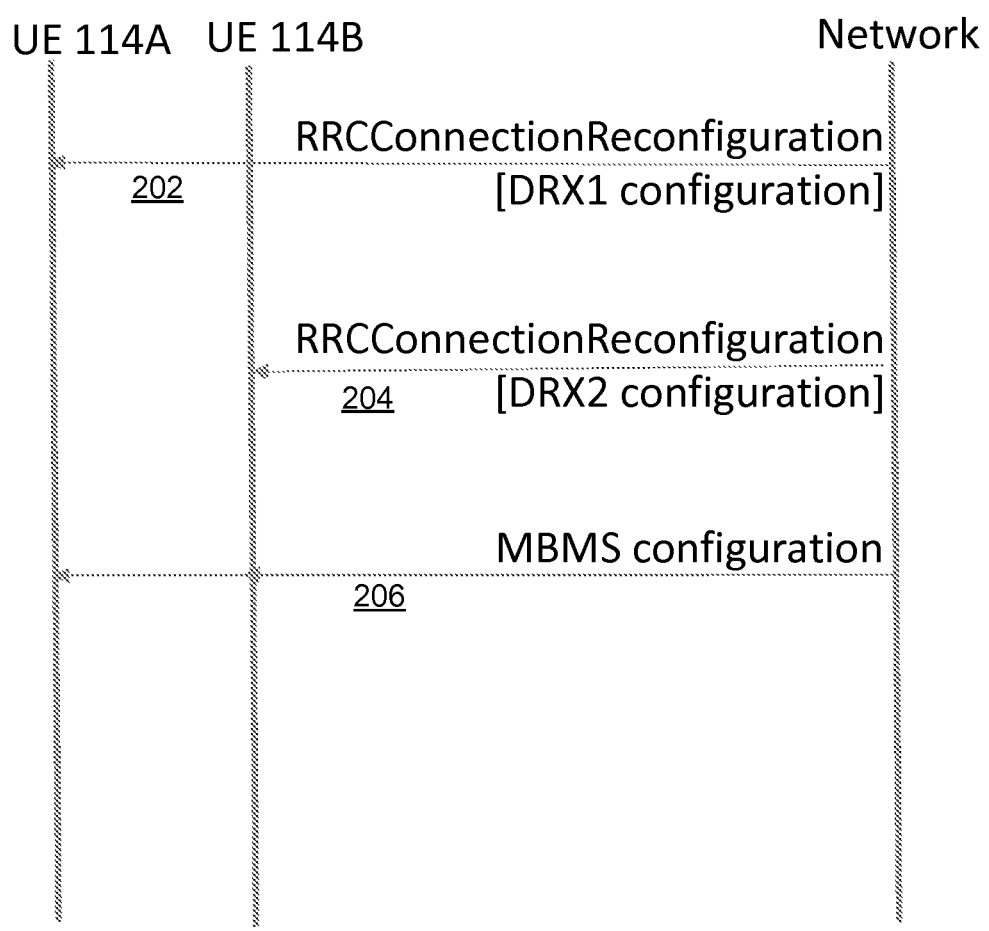
FIG. 2A depict an example of a process for multicast broadcast single-frequency network and discontinuous receive, in accordance with some exemplary embodiments.

FIG. 2A depicts an example process for independent MBMS AND DRX measurements and monitoring, in accordance with some example embodiments.

At 202, user equipment 114A may receive a radio resource control (RRC) configuration including among other things DRX configuration information for P2P-related operations at user equipment 114A, in accordance with some example embodiments. The P2P DRX configuration may also be used as a base for the expected measurements by a user equipment and, as such, measurement requirements at the user equipment. For example, user equipment 114A may receive a RRC connection reconfiguration message to setup and/or modify the connection configuration including a DRX configuration. The DRX configuration may describe the user equipment requirements related to PDCCH and/or resource allocation monitoring. As the DRX configuration and related monitoring rules may describe when the user equipment may monitor for potential resource allocations (for example, on PDCCH in E-UTRAN), the DRX configuration may also be used to set the measurements requirements for the user equipment, such as measurements performance requirements performed by the user equipment while configured with DRX. Moreover, the RRC connection reconfiguration message may be received from the network, such as base station 110C, although other access points may provide the RRC connection reconfiguration message as well.

User equipment 114B may, at 204, receive a RRC configuration including among other things DRX configuration information for P2P-related operations at user equipment 114B, in accordance with some example embodiments. The DRX configuration information may be received from an access point/base station in a manner similar to 202 noted above.

Figure 2B:
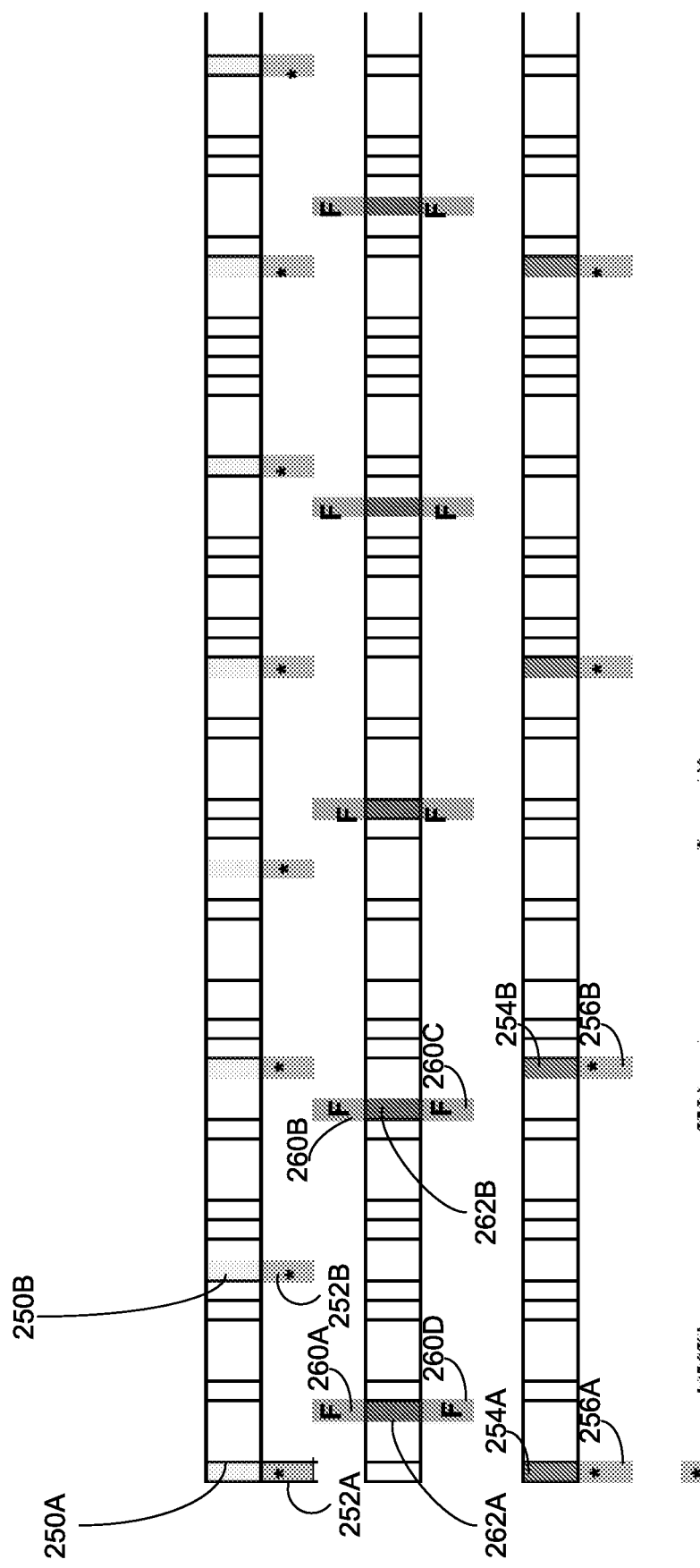
FIG. 2B depicts an example of the monitoring performed for multicast broadcast single-frequency network and discontinuous receive, in accordance with some exemplary embodiments.

FIG. 2B depicts an example of the monitoring and measurement information requirements which may be applied in the user equipment due to the provided DRX configurations at 202 and 204 via the RRC reconfiguration messages. At 250A, 250B, and so forth, the monitoring (and/or measurement) requirements for a user equipment are shown for user equipment 114A, while 252A, 252B, and so forth depict the measurements (and measurement requirements) made by user equipment 114A. At 254A, 254B, and so forth, the monitoring requirements are shown for user equipment 114B, while 256A, 256B, and so forth depict the measurements made (and measurement requirements applied) by user equipment 114B. Specifically, the network may configure user equipment 114A and 114B with PDCCH monitoring requirements based on the connection requirements (for example, latency, delay, and the like), and this is configured in the DRX configuration provided to the user equipment as illustrated in FIG. 2A. Because the monitoring requirements for user equipment 114A-B might not be the same, the DRX configuration may also differ among user equipment. Common reference signal (CRS) and/or mobility (for example, non-MBSFN) based measurement requirements may be based on the DRX as the DRX may dictate the monitoring requirements. For example, a user equipment may be awake due to monitoring requirements and may perform the measurements at the same time instances, so the user equipment does the required measurements when it is awake due to monitoring, and is not required to wake up just for the purpose of performing the measurement.

Referring again to FIG. 2A, user equipment 114B may receive, at 206, measurement information for an MBMS configuration, in accordance with some example embodiments. For example, user equipment 114A may receive MBMS control channel (MCCH) configuration information (for example, in one or more system information blocks, SIBs or in dedicated signaling). There may be a MCCH per MBSFN area, and the MCCH include, for example, the MBSFN area configuration information which may indicate the usage of allocated physical MBMS radio resources for the MBSFN area. There may be a scheduling period defined for the MTCH. In the beginning of each scheduling period, the network may transmit the MBMS scheduling information (MSI), which indicates the allocation of MBMS radio resources to the service(s) of the MBSFN area within the MBMS scheduling period. This scheduling information may be different for the services if multiple services are transmitted in the MBSFN area. The user equipment (which receives MBMS services and is configured to conduct MBSFN measurements) may also be configured to use only those received radio sub-frames that the user equipment is required to decode in order to receive the intended services sent via the MBMS. Moreover, there may be no requirement to do other measurements on the MBMS channels. The specified operation may thus set the basis for the monitoring requirements for a user equipment, such as user equipment 114A, operating in MBSFN mode.

Referring again to FIG. 2B, it shows an example of the monitoring requirements which may be provided at 206 via the configuration information. At 262A-D and so forth, the monitoring requirements are shown for user equipment 114A-B, while 260A, 260B, and so forth depict the measurements made by user equipment 114A-B. FIG. 2B also shows that MBSFN measurements and measurements requirements should not be based on the P2P monitoring requirements in DRX (which are user equipment specific) but instead on MBMS configuration and scheduling. MBMS configuration and scheduling may be configured by the network and specified in a standard.

FIGS. 2A and 2B illustrate that MBSFN measurements and non-MBSFN (for example, P2P DRX based) measurements (both RRC Connected mode and Idle mode) may be separated in a user equipment in the way that the non-MBSFN related measurement requirements (as specified by for example, TS 36.133) may remain unchanged despite the use of MBSFN measurement requirements as the MBSFN measurements and non-MBSFN (for example, DRX based) measurements are independent. To illustrate further, some (if not all) of the measurement requirements for MBSFN measurements may be specified separately from those used to specify standard non-MBSFN measurement requirements. Specifically, MBSFN measurement requirements may not be linked to the configured, used, and/or user equipment applied DRX (connected and/or idle mode) measurement/monitoring requirements. Process 200 may thus provide for example two parallel running measurement processes at a user equipment, and, in particular, a first measurement process may be at a user equipment for normal non-MBSFN related measurement(s), while a second measurement process at the user equipment may be implemented for MBSFN related measurements, which may be performed independently from non-MBSFN related measurements.

Figure 3:
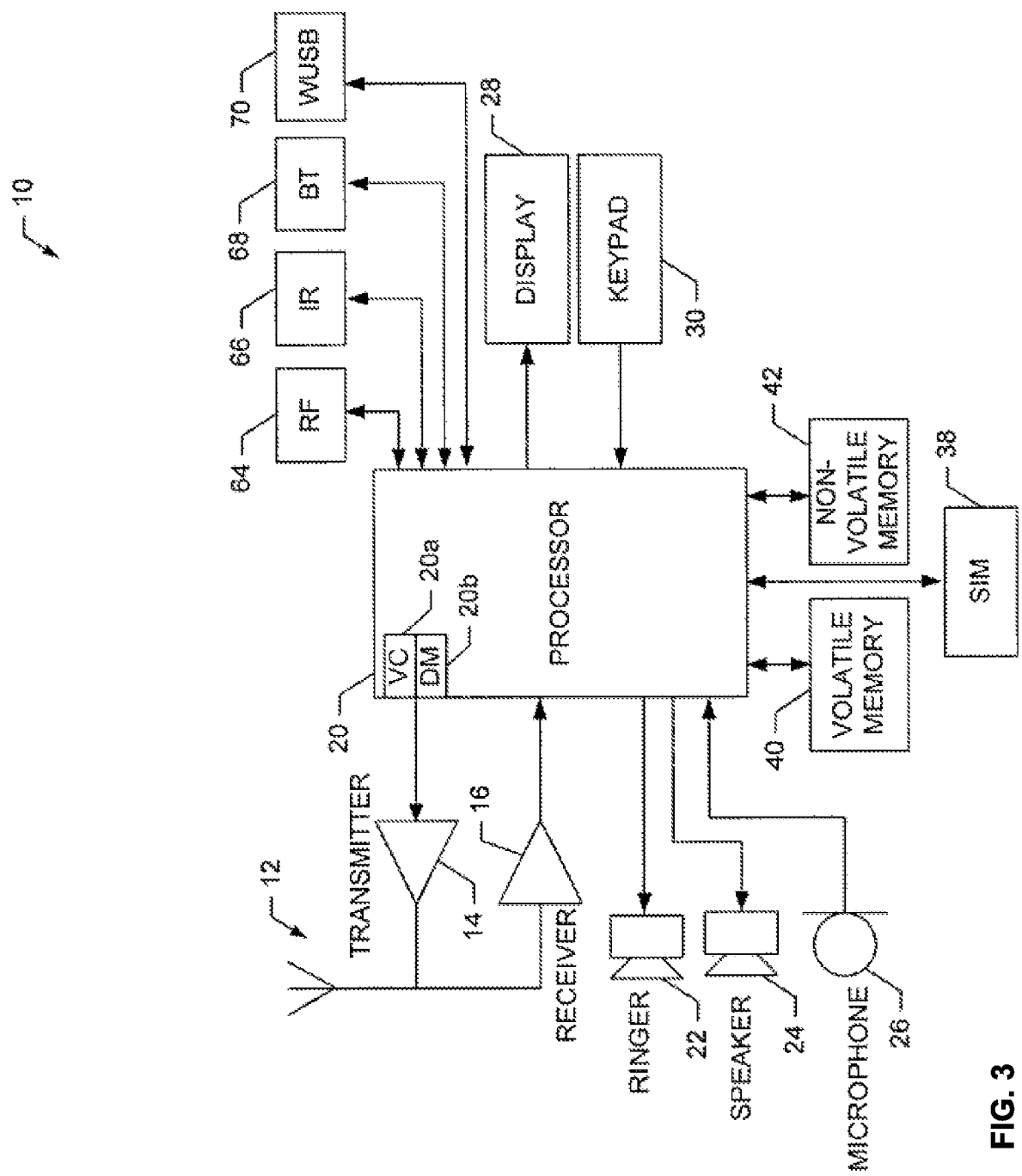
FIG. 3 depicts an example of a user equipment, in accordance with some exemplary embodiments.

FIG. 3 illustrates a block diagram of an apparatus 10, in accordance with some example embodiments. The apparatus 10 (or portions thereof) may be configured to provide a user equipment, a communicator, a machine type communication device, a wireless device, a wearable device, a smartphone, a cellular phone, a wireless sensor/device (for example, a wireless device which is part of a distributed architecture in for example, a car, a vehicle, a robot, a human, and/or the like). In the in case of the distributed architecture, the wireless device may communicate via one or more transceiver modules and/or via a hub that may hide the actual distribution of functionalities from the network.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 3 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 3, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations, such as process 200 and/or any other operations/functions disclosed herein. The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein with respect to process 200 including for example receiving, by a user equipment, an indication of a monitoring requirement for at least one of an idle mode of operation at the user equipment or a connected mode of operation at the user equipment; receiving, by the user equipment, information for one or more transmissions that are multicast or broadcast; and measuring, by the user equipment, the one or more transmissions that are multicast or broadcast, the measuring performed in accordance with the received information and without regard to the indication of the monitoring requirement for at least one of the idle mode of operation or the connected mode of operation.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 3, computer-readable medium may comprise a non-transitory computer-readable storage medium that may be any media that can contain or store the instructions for use by or in connection with an instruction execution system, apparatus, or device, such as a computer.

Figure 4:
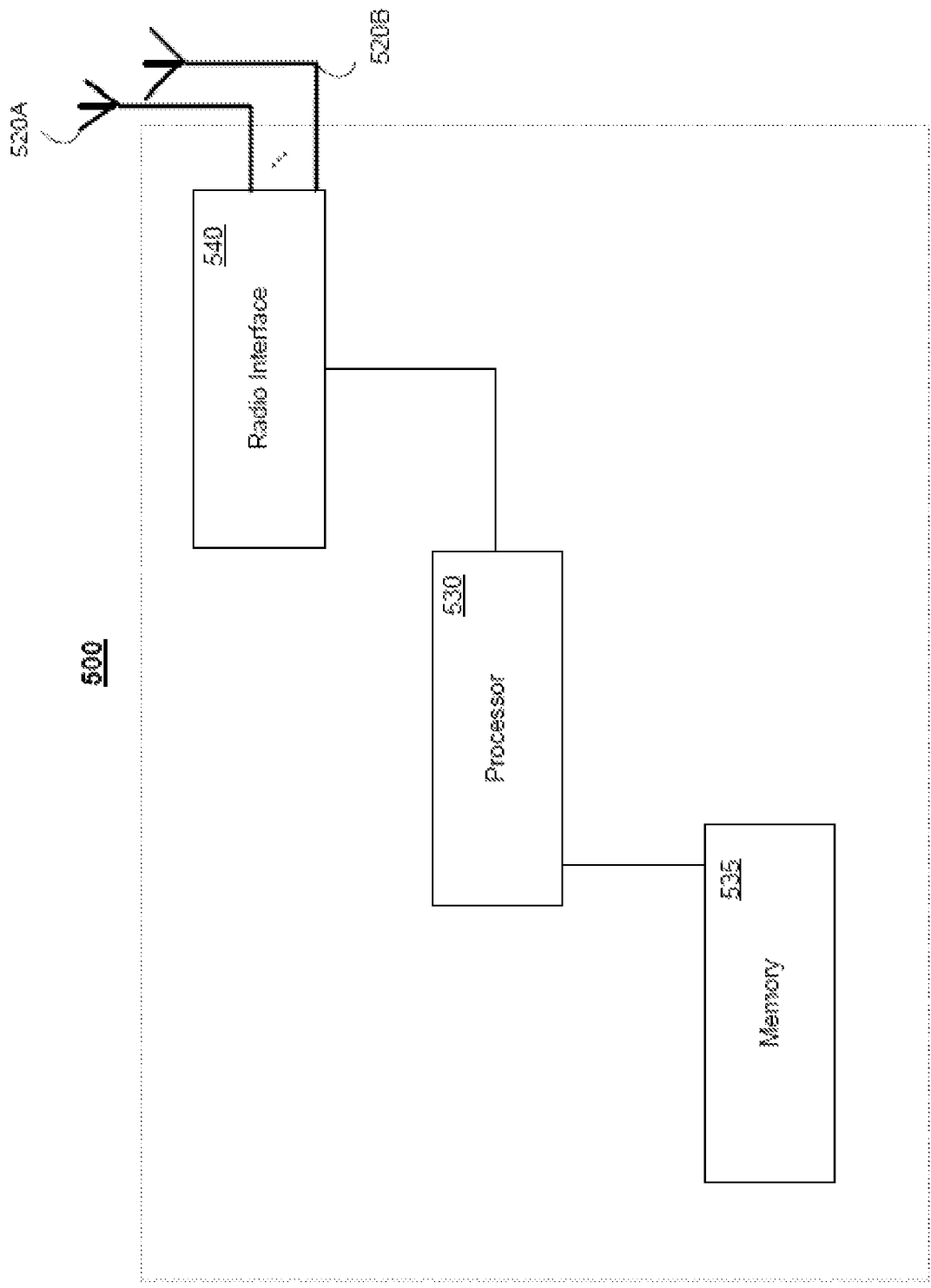
FIG. 4 depicts an example of a base station, in accordance with some exemplary embodiments.

FIG. 4 depicts an example implementation of a wireless access point 500, which may be implemented at for example base station 110A, B, or C in accordance with some example embodiments. The wireless access point may include one or more antennas 520 configured to transmit via downlinks and configured to receive uplinks via the antenna(s) 520. The wireless access point may further include a plurality of radio interfaces 540 coupled to the antenna(s) 520. The radio interfaces 540 may correspond to a plurality of radio access technologies including one or more of LTE, WLAN, Bluetooth, Bluetooth low energy, NFC, radio frequency identifier (RFID), ultrawideband (UWB), ZigBee, ANT, and the like. The radio interface 540 may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). The wireless access point may further include one or more processors, such as processor 530, for controlling the wireless access point 500 and for accessing and executing program code stored in memory 535. In some example embodiments, the memory 535 includes code, which when executed by at least one processor, causes one or more of the operations described herein with respect to the network at process 200 including for example sending an indication of a monitoring requirement for at least one of an idle mode of operation at the user equipment or a connected mode of operation at the user equipment and sending information for one or more transmissions that are multicast or broadcast.

Without in any way limiting the scope, interpretation, or application of the claims appearing below, a technical effect of one or more of the example embodiments disclosed herein is enhanced MBSFN and DRX operation due to the independent specification of the corresponding behaviors of MBSFN and DRX monitoring and measurements.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. A method comprising:
   receiving, by a user equipment of a cellular communication network, an indication of a monitoring requirement for at least one of an idle mode of operation at the user equipment or a connected mode of operation at the user equipment;
   receiving, by the user equipment, information for one or more multimedia broadcast multicast service transmissions that are multicast or broadcast; and
   measuring, by the user equipment, the one or more multimedia broadcast multicast service transmissions that are multicast or broadcast, the measuring performed in accordance with the received information and without regard to the monitoring requirement provided by the indication, wherein only subframes the user equipment is required to decode to receive the multimedia broadcast multicast service transmissions are used for multimedia broadcast multicast single-frequency network measurements, and wherein the measurements are reported to the cellular communications network.

2. The method of claim 1, further comprising:
   measuring, by the user equipment while in at least one of the idle mode or the connected mode, a radio channel in accordance with the received indication, without regard to the information for the one or more multimedia broadcast multicast service transmissions that are multicast or broadcast.

3. The method of claim 1, wherein the received information includes control channel configuration information.

4. The method of claim 3, wherein the control channel configuration information includes multimedia broadcast multicast service control channel configuration information.

5. The method of claim 3, wherein the control channel configuration information is carried by one or more system information blocks, dedicated signaling, or a combination of both.

6. The method of claim 1, wherein the monitoring requirement is independent of the information.

7. The method of claim 1, wherein the monitoring requirement includes at least one of a radio resource control configuration, a discontinuous receive configuration information, or a combination of both.

8. The method of claim 1, wherein the one or more multimedia broadcast multicast service transmissions include a multicast broadcast single-frequency network.

9. The method of claim 1, wherein the measuring the one or more multimedia broadcast multicast service transmissions includes monitoring the one or more multimedia broadcast multicast service transmissions.

10. The method of claim 1, wherein the idle mode and the connected mode comprise a discontinuous receive mode.

11. An apparatus comprising:
    at least one processor; and
    at least one memory including computer program code, the at least one memory and the computer program code configured to, with the at least one processor, cause the apparatus to perform at least the following:
    receive, by the apparatus of a cellular communication network, an indication of a monitoring requirement for at least one of an idle mode of operation at the apparatus or a connected mode of operation at the apparatus;
    receive, by the apparatus, information for one or more multimedia broadcast multicast service transmissions that are multicast or broadcast; and
    measure, by the apparatus, the one or more multimedia broadcast multicast service transmissions that are multicast or broadcast, the measure performed in accordance with the received information and without regard to the monitoring requirement provided by the indication, wherein only subframes the apparatus is required to decode to receive the multimedia broadcast multicast service transmissions are used for multimedia broadcast multicast single-frequency network measurements, and wherein the measurements are reported to the cellular communications network.

12. The apparatus of claim 11, wherein the apparatus is further caused to at least measure, while in at least one of the idle mode or the connected mode, a radio channel in accordance with the received indication, without regard to the information for the one or more multimedia broadcast multicast service transmissions that are multicast or broadcast.

13. The apparatus of claim 11, wherein the received information includes control channel configuration information.

14. The apparatus of claim 13, wherein the control channel configuration information includes multimedia broadcast multicast service control channel configuration information.

15. The apparatus of claim 13, wherein the control channel configuration information is carried by one or more system information blocks, dedicated signaling, or a combination of both.

16. The apparatus of claim 11, wherein the monitoring requirement is independent of the information.

17. The apparatus of claim 11, wherein the monitoring requirement includes at least one of a radio resource control configuration, a discontinuous receive configuration information, or a combination of both.

18. The apparatus of claim 11, wherein the one or more multimedia broadcast multicast service transmissions include a multicast broadcast single-frequency network.

19. The apparatus of claim 11, wherein the measuring the one or more multimedia broadcast multicast service transmissions includes monitoring the one or more multimedia broadcast multicast service transmissions.

20. The apparatus of claim 11, wherein the idle mode and the connected mode comprise a discontinuous receive mode.

* * * * *